United States Patent

Perego

[15] 3,687,591
[45] Aug. 29, 1972

[54] AN INJECTION MOLDING APPARATUS HAVING EJECTOR PINS WITH ORIENTED SHAPING SURFACES FOR PRODUCT REMOVAL

[72] Inventor: Guiseppe Perego, Via Buonarroti, 20043 Arcore, Italy

[22] Filed: July 6, 1970

[21] Appl. No.: 52,462

[30] Foreign Application Priority Data

April 17, 1970 Italy.....................23466 A/70

[52] U.S. Cl. ....................425/249, 249/68, 425/242, 425/444
[51] Int. Cl. .............................................B29f 1/14
[58] Field of Search .........18/2 RM, 2 RP, 30 WM, 30 WN, 18/DIG. 3; 249/67, 68

[56] References Cited

UNITED STATES PATENTS

| | | |
|---|---|---|
| 3,137,905 | 6/1964 | Steinman ...............18/2 RP X |
| 2,272,718 | 2/1942 | MacLagan et al. .....18/2 RP X |
| 3,013,303 | 12/1961 | Amazon..................18/2 RP X |
| 3,482,814 | 12/1969 | Hedgewick ............18/2 RP X |
| 2,733,479 | 2/1956 | English..................18/2 RM X |
| 3,482,815 | 12/1969 | Naturale................18/2 RM X |
| 3,057,014 | 10/1962 | Kirch.....................18/2 RM X |

Primary Examiner—J. Spencer Overholser
Assistant Examiner—David S. Safran
Attorney—McGlew and Toren

[57] ABSTRACT

A two-part injection mold produces plastic articles formed with hook portions, transversely perforated webs, or both. The plastic article is adapted, for example, to form the framework of a playpen or bed for children, and is capable of being disassembled, after molding, into an outer upper portion and a central base portion to which there may be fixed the upper and lower ends of an outer net, the metal supporting legs and, on top, a sun-shade support. One-half of the mold is fitted with pegs which aid in forming the hook and perforated portions of the article, and further serve to eject the finished article from the open mold.

1 Claim, 10 Drawing Figures

INVENTOR
GUISEPPE PEREGO
BY McGlew & Toren
ATTORNEYS

INJECTION MOLDING APPARATUS HAVING EJECTOR PINS WITH ORIENTED SHAPING SURFACES FOR PRODUCT REMOVAL

DESCRIPTION OF THE PREFERRED EMBODIMENT

Figure 1:
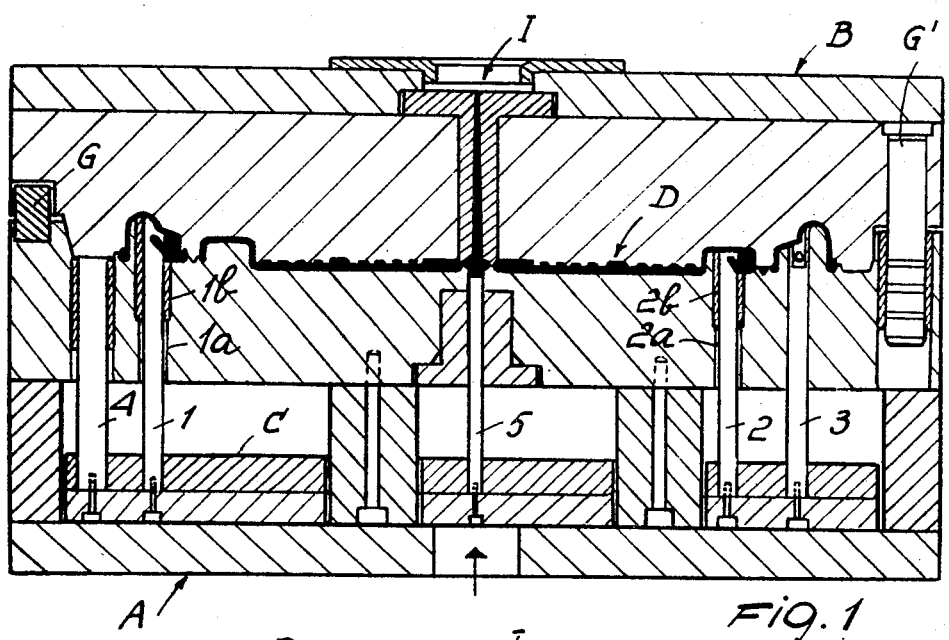
FIG. 1 is a diametrical sectional view of the mold in the closed condition and during the formation of the article.
Figure 2:
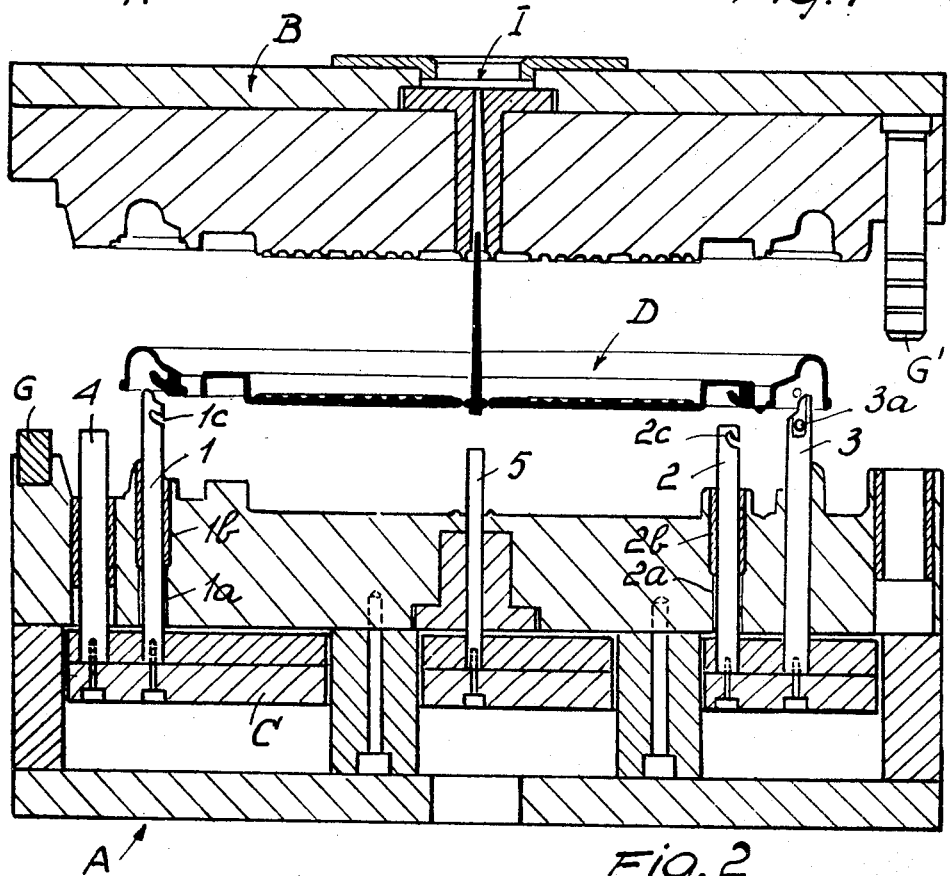
FIG. 2 is a similar view showing the open mold and the article ejected from the mold.
Figure 4:
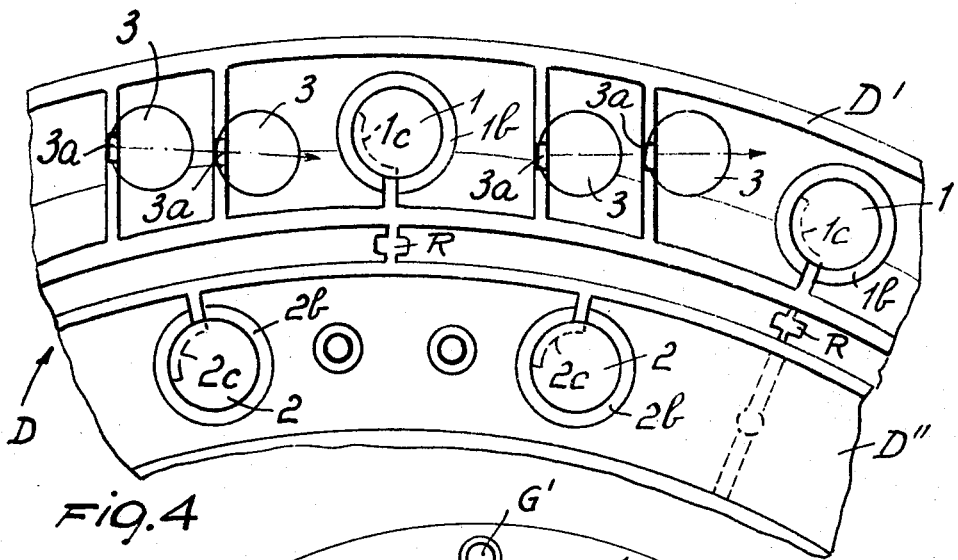
FIG. 4 is an enlarged view of a detail of the molded article.
Figure 3:
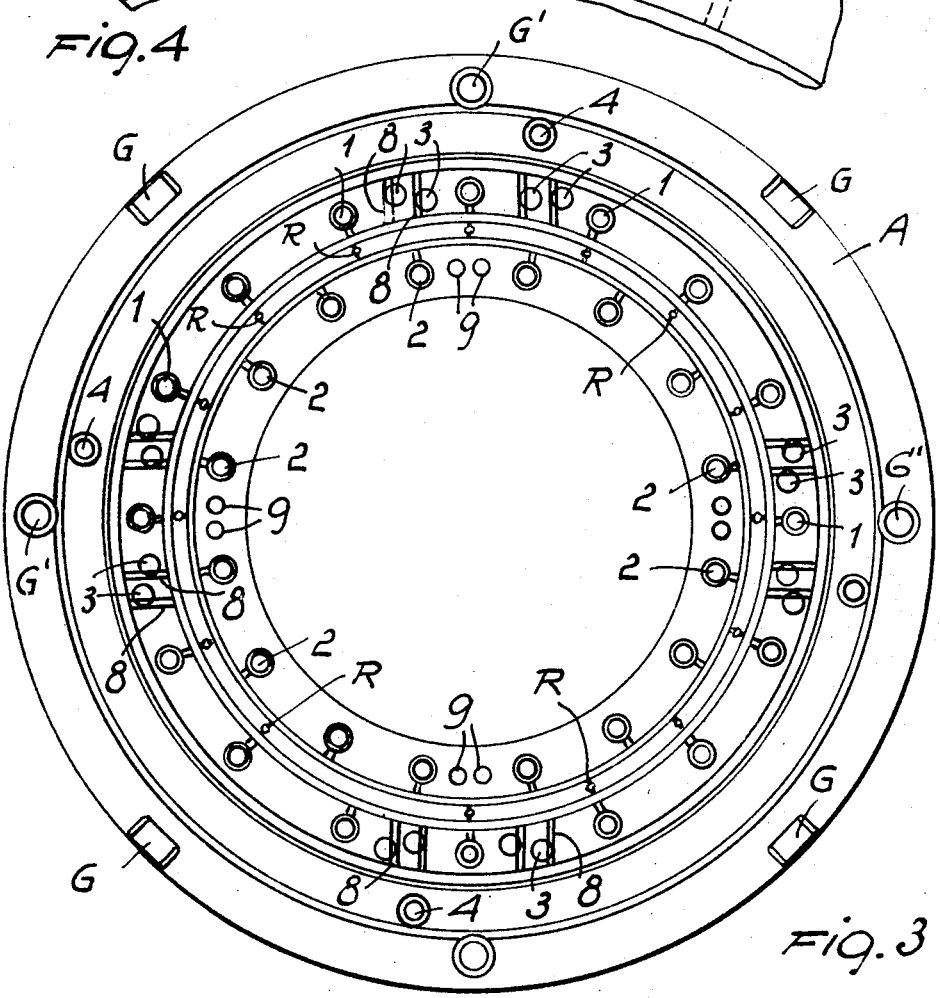
FIG. 3 is a top plan view of the lower mold half.
Figure 5:
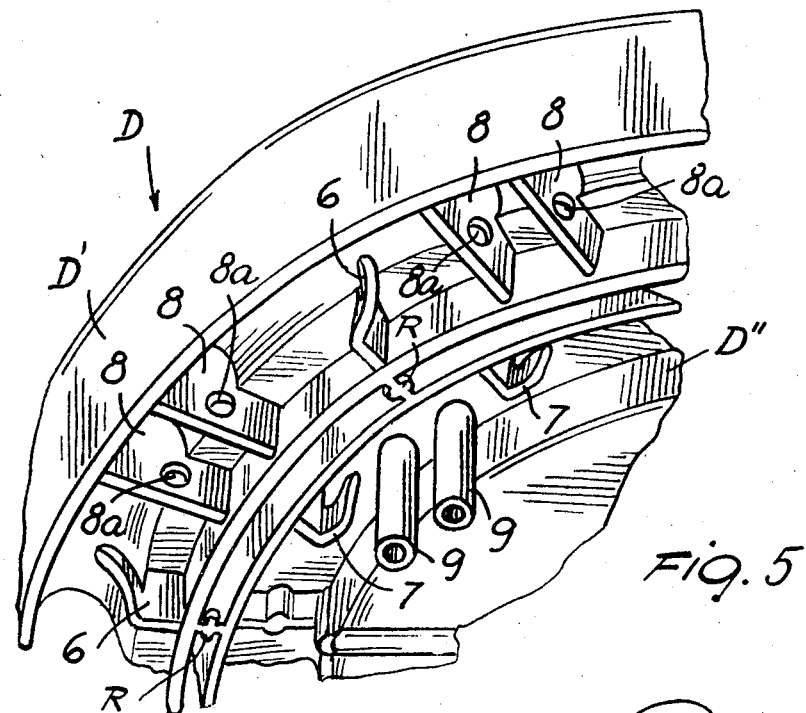
FIG. 5 is an enlarged perspective view of a portion of the manufactured article.
Figures 6, 7, 8:
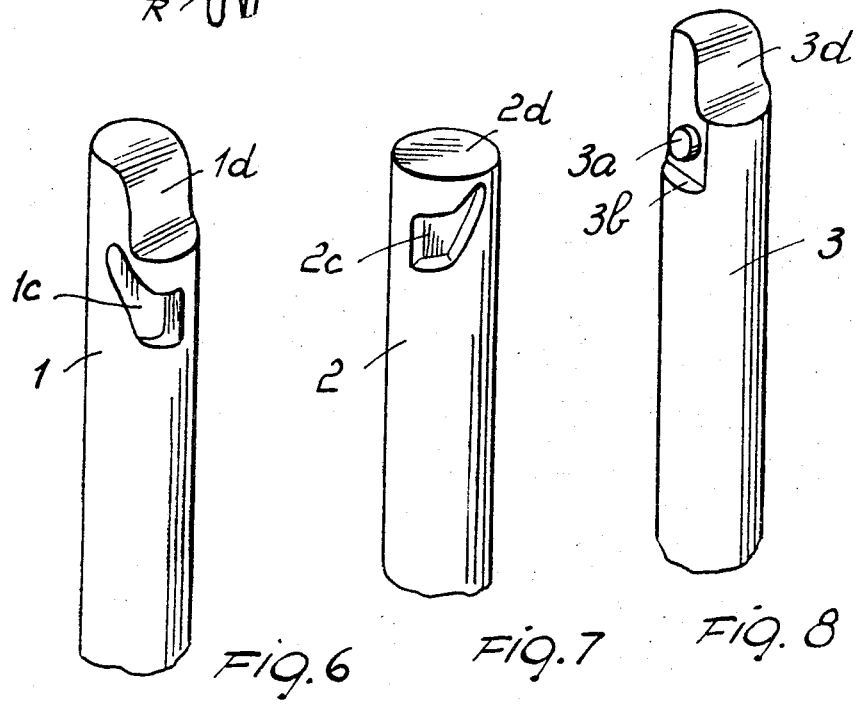
FIGS. 6, 7 and 8 are partial perspective views of the pegs for forming the hook and perforated portions of the mold and further serving to eject the molded article from the mold.
Figure 9:
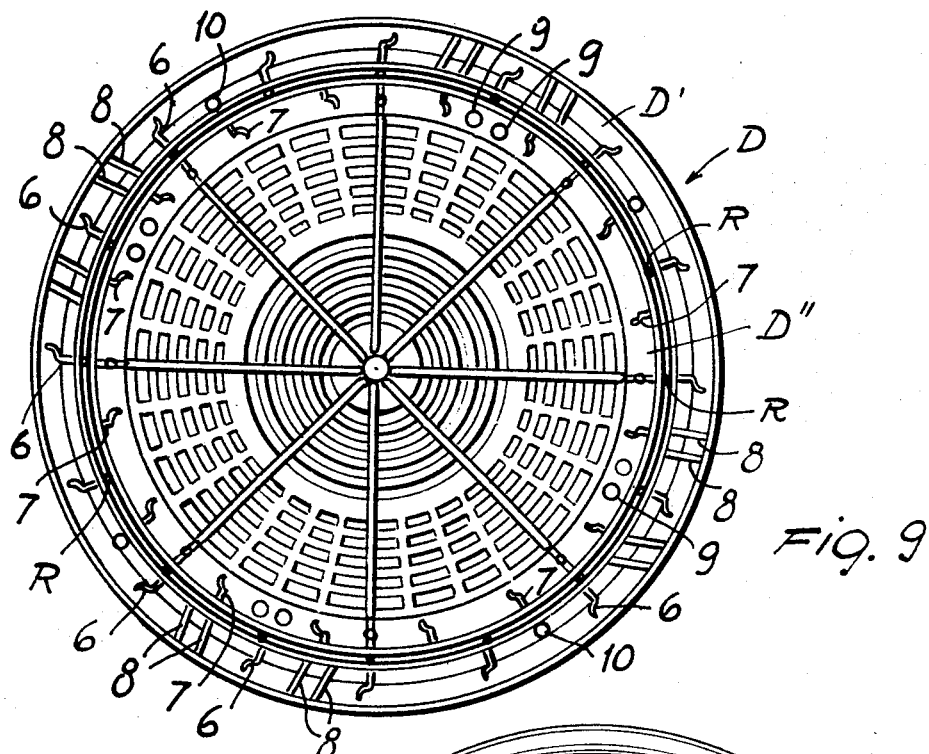
FIG. 9 is a plan view of the molded article before disassembly into two sections.
Figure 10:
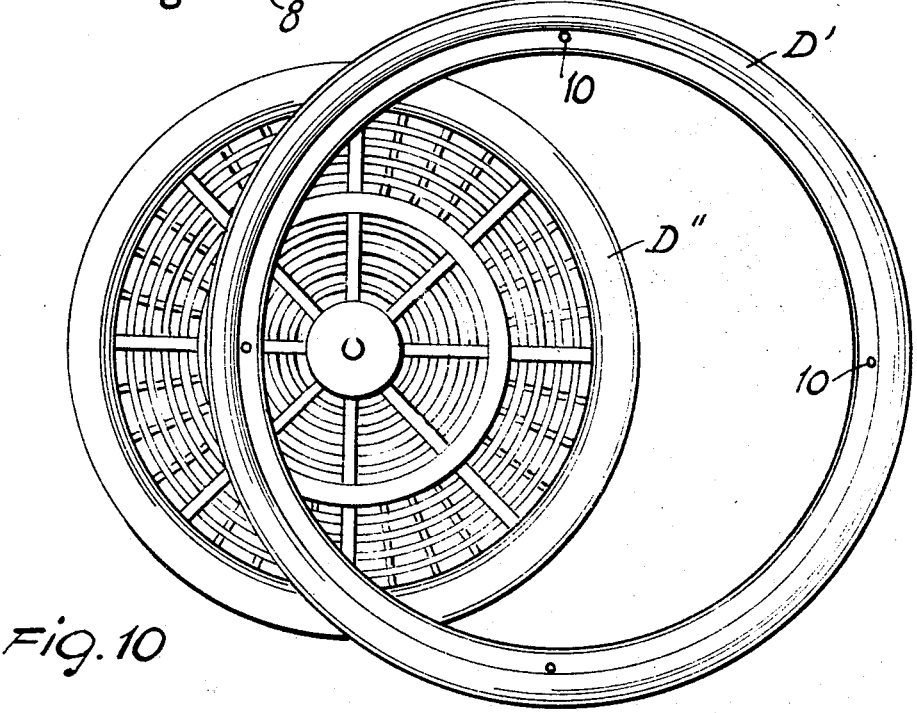
FIG. 10 is a plan view of the article as separated into two sections.

The equipment according to the present invention is illustrated by way of example only, without limitation, according to a preferred embodiment, in the accompanying drawings in which:

As may be seen from the drawing, the equipment according to the invention is comprised, as in a known injection molding process, of a base portion or lower mold half A and an upper portion or mold half B designed to be clamped together (FIG. 1) to define a mold cavity conforming to the article to be molded. The molding material, namely a plastic composition material, is injected into the mold cavity at I to form the molded article D. After molding, the article D can be ejected from the lower mold half A by an ejector C after the upper mold half B has been separated from the lower mold half following the molding.

The main feature of the equipment according to the invention is the pegs 1, 2, 3 which cooperate with ejector C to lift the manufactured article. As mentioned, pegs 1, 2, and 3 cooperate in the formation of the hook portions 6, 7 and of sectors or webs 8, transversely perforated at 8a, respectively. For this purpose the pegs 1, 2 are formed with cavities 1c, 2c of suitable shape adapted to retained part of the injected material, and the pegs 3 with a side hollow 3b, interrupted by a lug of circular section 3a, also adapted to retain part of the injected material. Also, because the cavities 1c, 2c and the lugs 3a respectively, face in the same direction when the cycle ends, a short rotation of 4°-5° of the manufactured article caused by the contraction of the material in cooling from a temperature of 230° to the cooling temperature of the die is permitted.

This short rotation permits automatic disengagement of the manufactured article from the die, and its extraction.

In the drawing G, G' are columns adapted to guide mold halves A and B of the die by engagement in suitable opposed cavities and the side pegs 4 and center peg 5 are pegs known, and 1a, 1b and 2a, 2b are suitable cylindrical seats or guide sleeves for pegs 1, 2 which allow easy upward sliding thereof.

The pegs 1, 2, 3 mentioned above present, at their upper ends respective profiles 1d, 2d, 3d complementary to profiles of the manufactured article D to be constructed. The latter may be, as in the example, designed as two concentric portions D', D'' joined only by weak ribs R and therefore detachable from one another upon ejection from the die and presenting cylindrical cavities 9 and 10. Thereby the article lends itself to retain, at hooks 6 and 7, the upper and lower edges of a net laterally defining a box or playpen for children, at 8a the ends, facing each other and bent at 90°, of its metal supporting legs, at 9 the ends of the locking hooks of the legs, and at 10 the ends of posts adapted to support a sun-shade and also adapted to overhang toys.

As it appears from the foregoing, no other working step, such as undercutting, nailing or welding, is necessary to modify or complete the molded article which is therefore immediately ready for use and thus capable of production on a large scale at a cost considerably lower than known similar or like articles.

While the drawings and description have been directed to the manufacture of a playpen with a circular base and top, the invention is applicable equally to the molding of articles having other peripheral contours, such as square or rectangular, and to the manufacture of other articles, such as beds. The key feature is the use of the pegs 1, 2, and 3 to form hooks, perforated webs, or both, for assembly of the completed article.

While a specific embodiment of the invention has been shown and described in detail to illustrate the application of the principles of the invention, it will be understood that the invention may be embodied otherwise without departing from such principles.

I claim:

1. Injection molding apparatus, for producing molded plastic articles having hook portions, perforated webs, or both, and capable of disassembly, after molding, into separate components, said apparatus comprising, in combination, two interengageable compression mold halves defining, when closed, a mold cavity conforming to the article to be molded; interengageable guiding means on said mold halves for guiding the same into closed relation; pins extending outwardly of one mold half into the mold cavity to cooperate with cavity formations on the other mold half, each of said pins being formed with a cavity at its outer end; certain of said pin cavities having a hook-defining contour and others of said pin cavities having a lug extending substantially centrally therefrom; said pin cavities receiving and retaining plastic composition material injected into said mold cavity to form hook portions and perforated web portions of the molded article; an ejector movably mounted outwardly of said one mold half and carrying article ejecting pins extending slidably through said one mold half; said first-named pins being mounted on said ejector and extending slidably through said one mold half and serving as additional article ejecting pins when said ejector is moved inwardly toward said one mold half to eject the finished article from the mold cavity following retraction of the other mold half from said one mold half; all of said pin cavities opening in the same rotational direction and providing for automatic disengagement of the molded article from said pin cavities, following ejection of the article by said ejector, by slightly rotating the molded article through an angular distance of 4°–5° in said rotational direction and relative to said first-mentioned pins.

\* \* \* \* \*